(12) United States Patent
Pai et al.

(10) Patent No.: US 9,606,309 B2
(45) Date of Patent: Mar. 28, 2017

(54) OPTICAL COUPLING MODULE AND PHOTOELECTRIC CONVERSION DEVICE INCLUDING SAME

(71) Applicant: HON HAI PRECISION INDUSTRY CO., LTD., New Taipei (TW)

(72) Inventors: Shang-Yi Pai, New Taipei (TW); Chien-Hui Lin, New Taipei (TW); Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/861,555

(22) Filed: Sep. 22, 2015

(65) Prior Publication Data
US 2016/0349468 A1    Dec. 1, 2016

(30) Foreign Application Priority Data
May 29, 2015 (CN) .......................... 2015 1 0287626

(51) Int. Cl.
*G02B 6/32* (2006.01)
*G02B 6/42* (2006.01)

(52) U.S. Cl.
CPC ............. *G02B 6/4243* (2013.01); *G02B 6/32* (2013.01); *G02B 6/425* (2013.01); *G02B 6/4206* (2013.01); *G02B 6/428* (2013.01); *G02B 6/4214* (2013.01); *G02B 6/4295* (2013.01)

(58) Field of Classification Search
CPC .. G02B 6/4243; G02B 6/4214; G02B 6/4206; G02B 6/425; G02B 6/32; G02B 6/428; G02B 6/4295
See application file for complete search history.

(56) References Cited

U.S. PATENT DOCUMENTS

2013/0336617 A1* 12/2013 Otte ..................... G02B 6/4214
                                                                    385/77

* cited by examiner

*Primary Examiner* — Ryan Lepisto
(74) *Attorney, Agent, or Firm* — Zhigang Ma

(57) ABSTRACT

An optical coupling module includes a top surface, a bottom surface parallel and opposite to the top surface, a front side surface, and a rear side surface parallel and opposite to the front side surface. The bottom surface defines a bottom groove including a first optical surface. Optical coupling lenses are arranged on the first optical surface. The bottom groove further includes a mounting surface parallel to the first optical surface and perpendicularly connected with the front side surface. Grooves in the mounting surface receive and locate optical fibers, which intersect with a straight line along the optical axes of the optical coupling lenses, the straight line runs between the optical coupling lenses and the photoelectric conversion members.

18 Claims, 6 Drawing Sheets

US 9,606,309 B2

OPTICAL COUPLING MODULE AND PHOTOELECTRIC CONVERSION DEVICE INCLUDING SAME

The subject matter herein generally relates to fiber optic communications.

BACKGROUND

In the field of fiber optic communications, an optical signal coupling assembly often includes a first connector and a second connector coupling to the first connector to realize transmission of signals. Transmission quality of the signals is determined by the alignment between the first connector and the second connector, and the alignment between a light source and the first or second connector.

BRIEF DESCRIPTION OF THE DRAWINGS

Implementations of the present technology will now be described, by way of example only, with reference to the attached figures.

DETAILED DESCRIPTION

Figure 1:
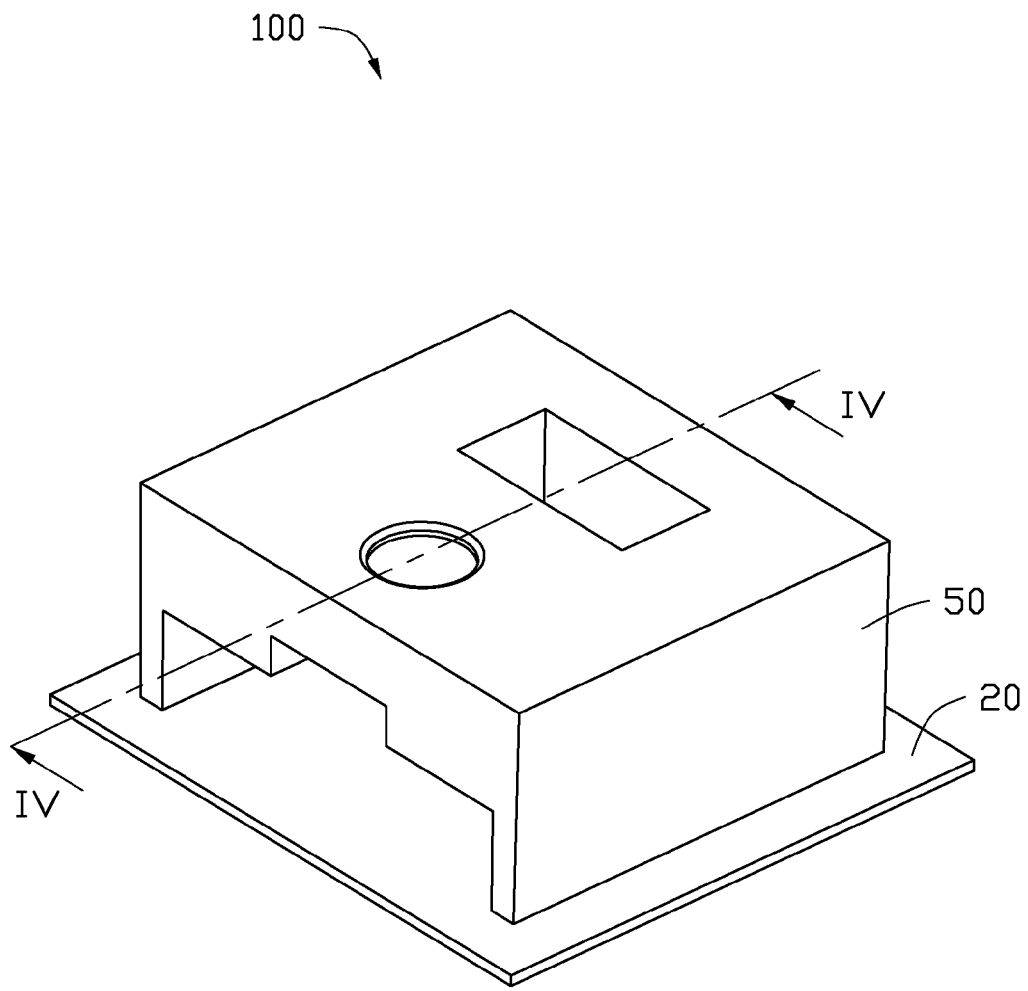
FIG. 1 is an isometric view of a photoelectric conversion device in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
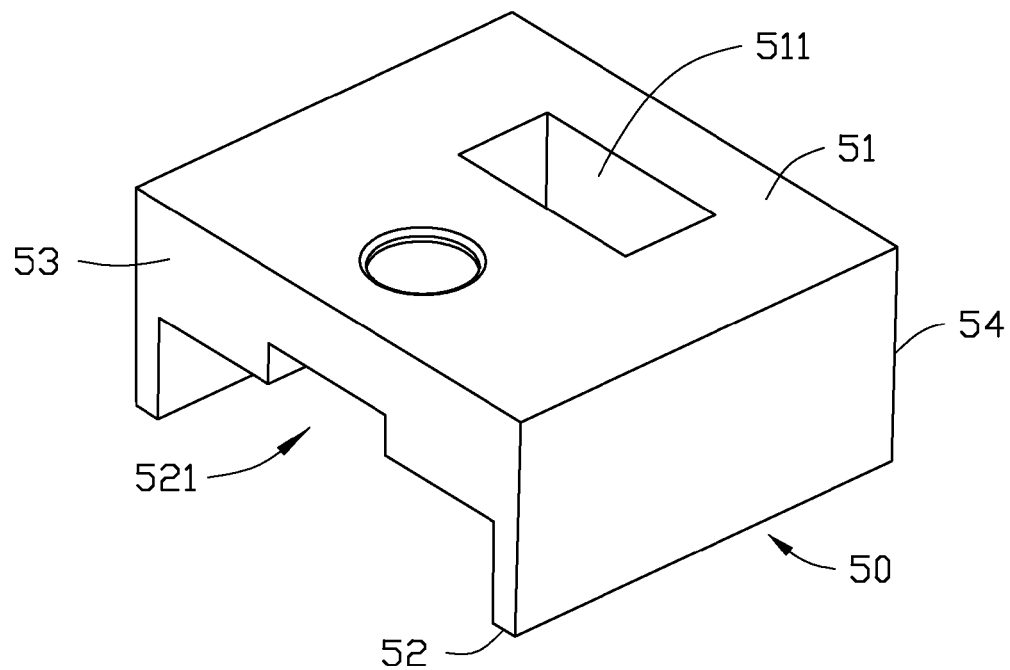
FIG. 2 is an exploded isometric view of the photoelectric conversion device of FIG. 1.
Figure 2:
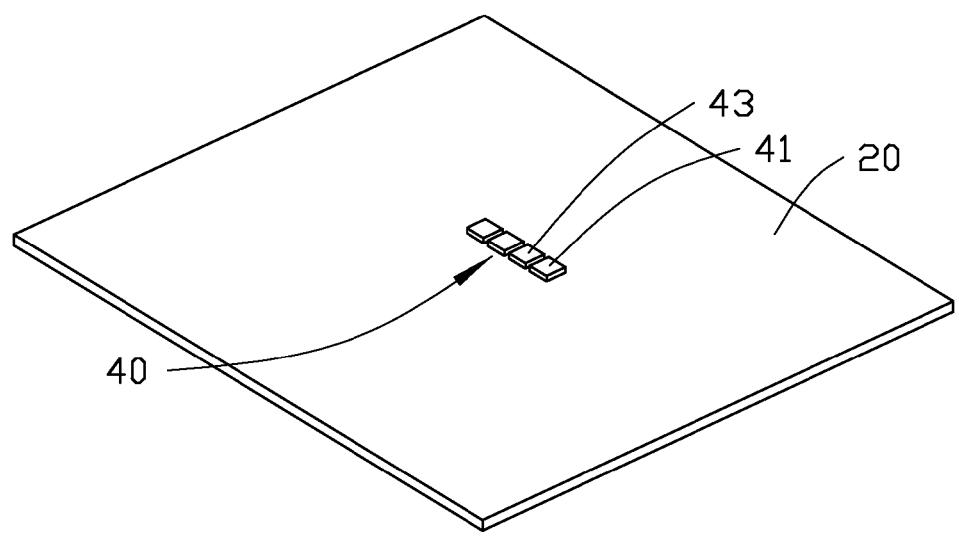

FIG. 1 and FIG. 2 illustrate a photoelectric conversion device 100 according to a first embodiment. The photoelectric conversion device 100 includes a printed circuit board 20, a plurality of photoelectric conversion members 40 mounted on the printed circuit board 20, and an optical coupling module 50.

The photoelectric conversion member 40 is configured to convert optical signals to electrical signals, or convert electrical signals into optical signals. In the illustrated embodiment, the photoelectric conversion members 40 includes two light emitting members 41 to emit signals and two light receiving members 43 to receive signals and convert the optical signals into electrical signals. The light emitting member 41 is a laser diode and the light receiving member 43 is a photo diode. The two light emitting members 41 and two light receiving members 43 are in a line. In an alternative embodiment, the number of light emitting members 41 can be more than two.

The optical coupling module 50 is substantially cuboid and made from transparent plastic. The optical coupling module 50 is installed on the printed circuit board 20 and includes a top surface 51, a first bottom surface 52 opposite to the top surface 51, a front side surface 53, and a rear side surface 54 opposite to the front side surface 53. The first bottom surface 52 faces toward the printed circuit board 20. The first bottom surface 52 defines a bottom groove 521 which is stepped in shape.

Figure 3:
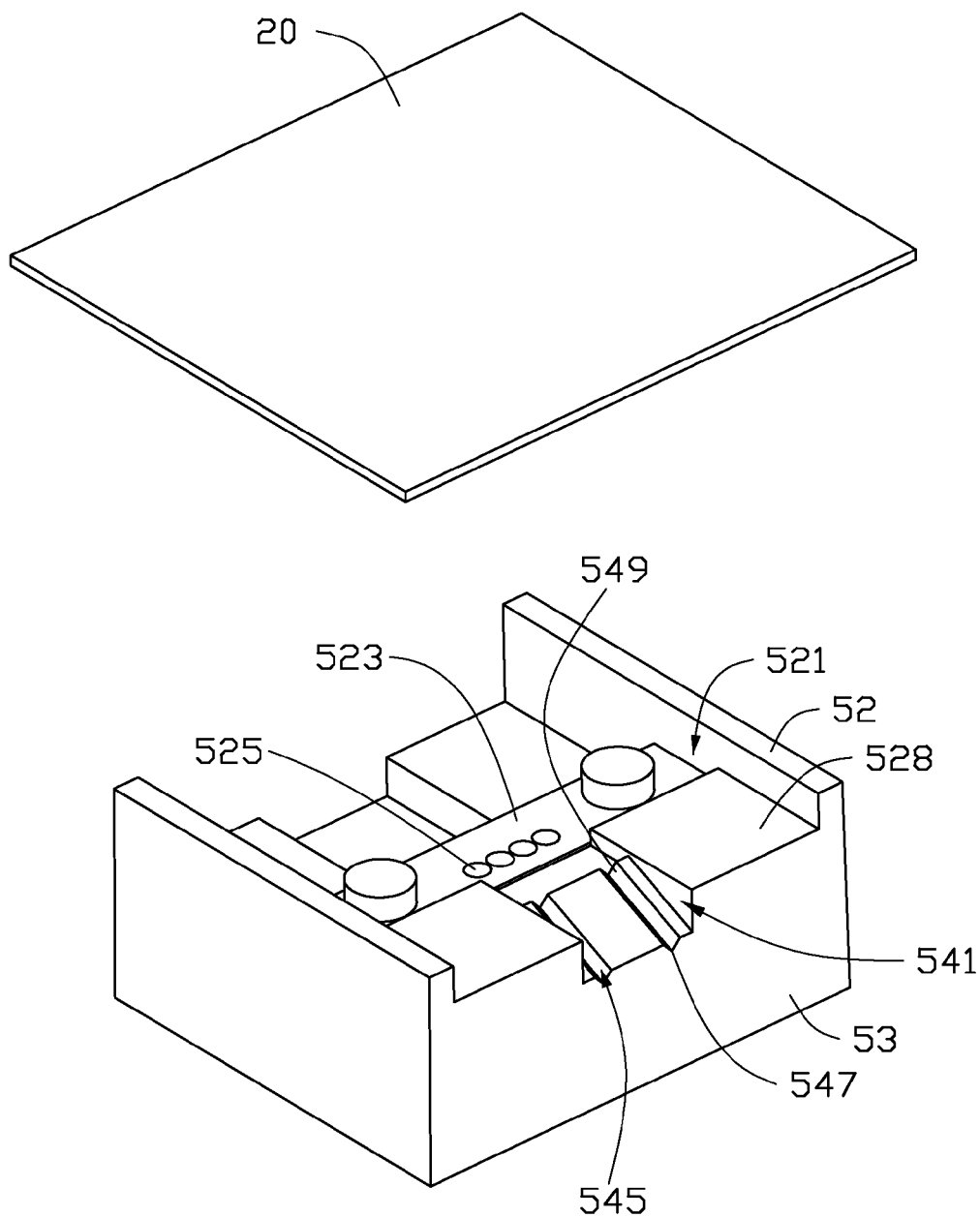
FIG. 3 is similar to FIG. 2, but viewed from another angle.

The bottom groove 521 opens from the first bottom surface 52 toward the top surface 51 and runs through the front side surface 53 and the rear side surface 54, as shown in FIG. 3. The bottom groove 521 includes a first optical surface 523, a second optical surface 527 perpendicularly connected with the first optical surface 523, and a mounting surface 528 parallel to the first optical surface 523 and perpendicularly connected with the front side surface 53. The mounting surface 528 is closer than the first optical surface 523 to the first bottom surface 52. The first optical surface 523 and the mounting surface 528 cooperatively form a step portion. A plurality of first optical coupling lenses 525 in a line are arranged on the first optical surface 523, and each first optical coupling lens 525 corresponds with a photoelectric conversion member 40. The number of first optical coupling lenses 525 is four.

A plurality of second optical coupling lenses 529 are arranged on the second optical surface 527, each second optical coupling lens 529 corresponds with a first optical coupling lens 525.

Figure 4:
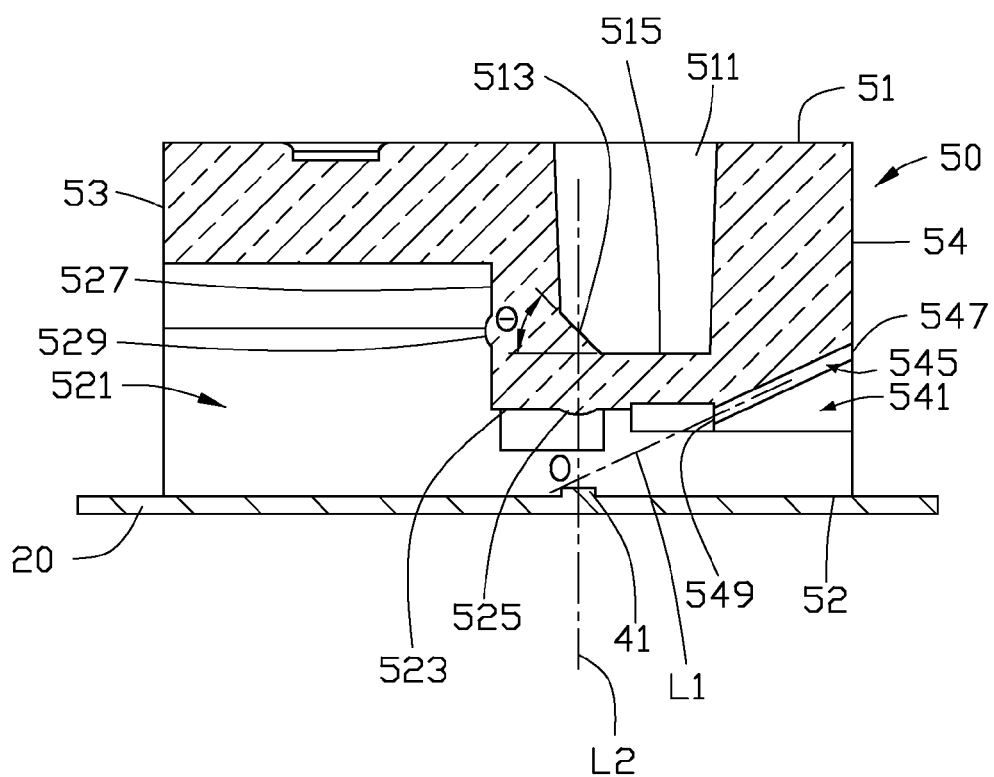
FIG. 4 is a cross sectional view of the photoelectric conversion device taken along line IV-IV of FIG. 1.

The top surface 51 defines a top groove 511 and the top groove 511 is substantially cuboid, as shown in FIG. 4. The top groove 511 includes a reflecting surface 513 and a second bottom surface 515 which is obliquely connected with the reflecting surface 513, the second bottom surface is parallel to the top surface 51. The acute angle θ formed between the reflecting surface 513 and the second bottom surface 515 is less than 90 degrees. In the illustrated embodiment, the acute angle θ is about 45 degrees. The reflecting surface 513 is located on a light path of the photoelectric conversion member 40. Light from the photoelectric conversion member 40 is thus collimated by the first optical coupling lens 525, reflected by the reflecting surface 513, and collimated again by the second optical coupling lens 529.

The mounting surface 528 defines a cutout 541. The cutout 541 includes a plurality of receiving grooves 545 configuring to receive optical fibers 70. Optical fibers 70 received in the receiving grooves 545 intersect with an alignment between the photoelectric conversion member 40 and the first optical coupling lens 525 of the optical coupling module 50. The receiving grooves 545 are inclined relative to the mounting surface 528 and include a first end 547 and a second end 549 opposite to the first end 547. The second end 549 is closer than the first end 547 to the first bottom surface 52. A straight line along a central axis of the inclined receiving groove 545 is L1 and a straight line along an optical axis of the first optical coupling lens 525 is L2. Line L1 intersects with line L2 and meets at point O, point O being on a light path of the photoelectric conversion member 40, as shown in FIG. 4. When an optical fiber 70 is received in the inclined receiving groove 545, one end of the optical fiber 70 is located above the first optical coupling lens 525, enabling light from the photoelectric conversion member 40 to enter into the optical fiber 70.

Figure 5:
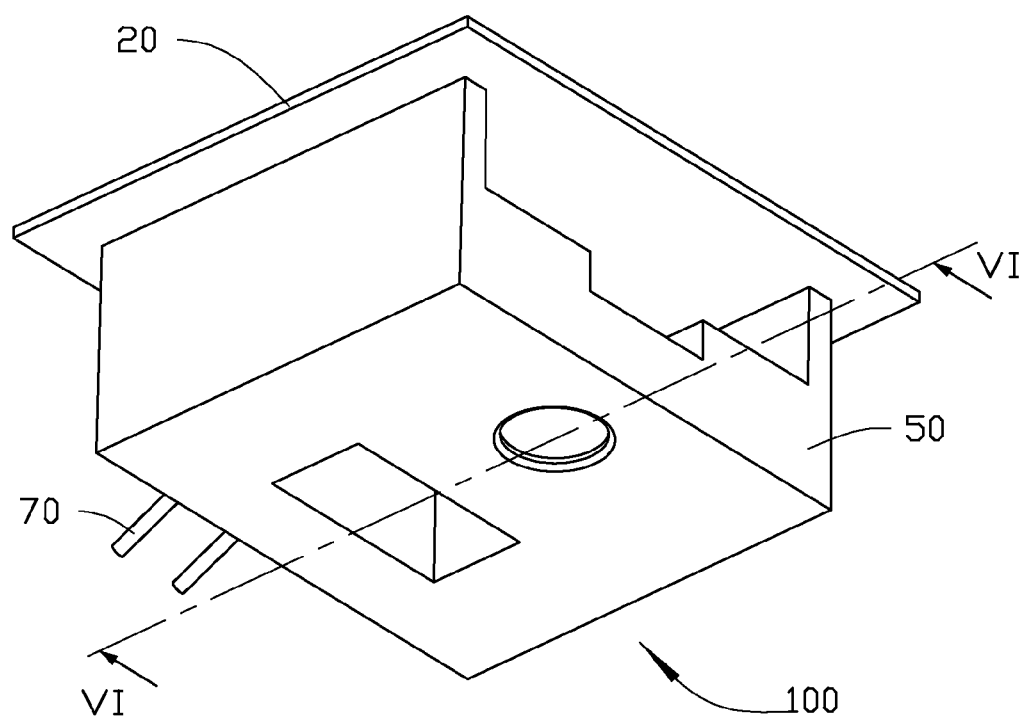
FIG. 5 is an isometric view of the detection of an installation accuracy of the photoelectric conversion device in FIG. 1.
Figure 6:
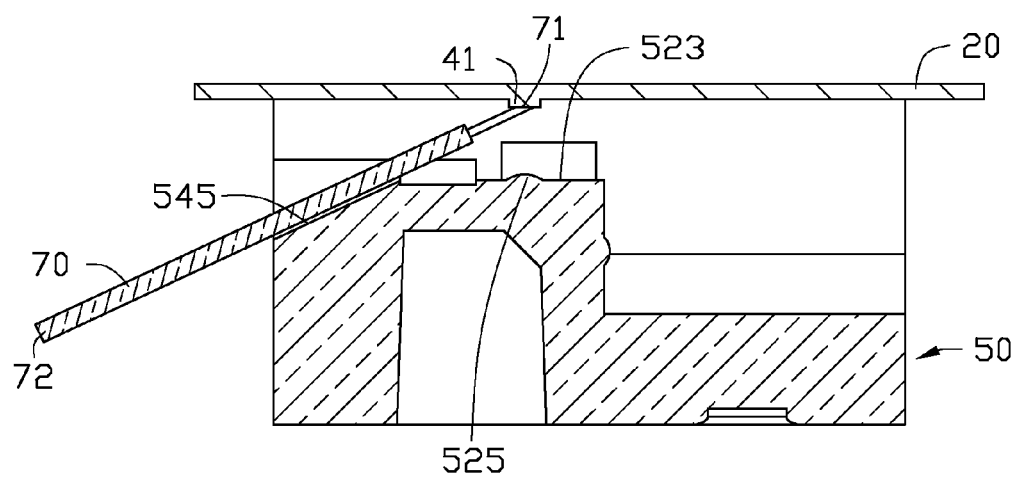
FIG. 6 a cross sectional view taken along line VI-VI of FIG. 5.

When the photoelectric conversion device 100 is in use, the correct, or an incorrect, alignment between the photoelectric conversion member 40 and the first optical coupling lens 525 should firstly be detected. The detecting method is described as follows:

The optical coupling module 50 is fixed on the printed circuit board 20, and then the structure is rotated about 180 degrees to raise the printed circuit board 20 above the optical coupling module 50, as shown in FIG. 5. This step enable to detect and analyze the alignment with the optical fibers 70 not need to fixed in the receiving grooves 545. Two optical fibers 70 are provided, each optical fiber 70 includes an inclined end surface 71 and a far end surface 72 opposite to the inclined end surface 71. Each optical fiber 70 is inserted in the receiving grooves 54 and the inclined end surface 71 is located above the light emitting member 41, because line L1 intersects line L2. In the illustrated embodiment, the inclined end surface 71 makes contact with the light emitting member 41, as shown in FIG. 6, ensure light emitted from the light emitting member 41 is able to enter into the optical fiber 70. Then, the light emitting member 41 emits light with a pre-determined luminous intensity. A detecting member (not shown), such as a photo diode, is coupled with the far end surface 72 of the optical fiber 70 to detect an actual luminous intensity of the light emitted at the far end surface 72. The actual luminous intensity is compared with the pre-determined luminous intensity and alignment between the photoelectric conversion member 40 and the first optical coupling lens 525 can be adjusted to achieve at least the predetermined level of luminous intensity.

When the detection is completed, the optical fibers 70 are removed from the receiving grooves 545, and optical signals are transmitted along the light path which is formed by the photoelectric conversion member 40, the first optical coupling lens 525, the reflecting surface 513, and the second optical coupling lens 529. In this disclosure, the actual alignment between the photoelectric conversion member 40 and the first optical coupling lens 525 is directly detected by an optical fiber arranged in the single optical coupling module 50 and a detecting member coupled with the far end surface 72 of the optical fiber 70. This avoids a transmission lost between two optical coupling modules, and detection accuracy is higher.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical coupling module comprising:
    a top surface;
    a first bottom surface parallel and opposite to the top surface, the first bottom surface defining a bottom groove comprising a first optical surface, the first optical surface including a plurality of first optical coupling lenses;
    a front side surface perpendicularly connected with the top surface; and
    a rear side surface parallel and opposite to the front side surface;
    wherein the bottom groove further comprises a mounting surface, the mounting surface is parallel to the first optical surface and perpendicularly connected with the front side surface, wherein the distance between the mounting surface and the first bottom surface is less than the distance between the first optical surface and the first bottom surface, wherein the mounting surface defines a plurality of receiving grooves configured to receive optical fibers, wherein the receiving grooves comprise a central axis, the central axis extending transversely along a lengthwise direction of the receiving grooves to intersects with an optical axis of the first optical coupling lenses; and wherein the mounting surface further comprises a cutout running through the front side surface and the mounting surface, the receiving grooves being arranged in the cutout.

2. The optical coupling module of claim 1, wherein the receiving groove is inclined relative to the mounting surface and comprises a first end and a second end spaced from and opposite to the first end, the distance between the second end and the mounting surface is less than the distance between the first end and the mounting surface.

3. The optical coupling module of claim 2, wherein the bottom groove comprises a second optical surface perpendicularly connected with the first optical surface, the second optical surface comprises a plurality of second optical coupling lenses, each second optical coupling lens corresponding to each first optical coupling lens.

4. The optical coupling module of claim 2, wherein the top surface defines a top groove and the top groove is substantially cuboid, the top groove comprises a reflecting surface and a second bottom surface which is obliquely connected with the reflecting surface, the second bottom surface is parallel to the top surface, an angle formed between the reflecting surface and the second bottom surface is less than 90 degrees.

5. A photoelectric conversion device comprising:
    a printed circuit board comprising a plurality of photoelectric conversion members mounted thereon; and
    an optical coupling module comprising:
        a top surface;
        a first bottom surface parallel and opposite to the top surface, the first bottom surface defining a bottom groove comprising a first optical surface, the first optical surface being arranged with a plurality of first optical coupling lenses;
        a front side surface perpendicularly connected with the top surface; and
    a rear side surface parallel and opposite to the front side surface;
        wherein the bottom groove further comprises a mounting surface, the mounting surface is parallel to the first optical surface and perpendicularly connected with the front side surface, wherein the distance between the mounting surface and the first bottom surface is less than the distance between first optical surface and the first bottom surface, wherein the mounting surface defines a plurality of receiving grooves configured to receive optical fibers, wherein the receiving grooves comprise a central axis, the central axis extending transversely along a lengthwise direction of the receiving grooves to intersect with an optical axis of the first optical coupling lenses; and wherein the mounting surface further comprises a cutout running through the front side surface and the mounting surface, the receiving groove being arranged in the cutout.

6. The photoelectric conversion device of claim 5, wherein the photoelectric conversion member comprises a plurality of light emitting members for emitting optical signals and a plurality of light receiving members for converting electrical signals into optical signals.

7. The photoelectric conversion device of claim 6, wherein the light emitting member is a laser diode and the light receiving member is a photo diode.

8. The photoelectric conversion device of claim 5, wherein the receiving groove is inclined relative to the mounting surface and comprises a first end and a second end spaced from and opposite to the first end, the distance between the second end and the mounting surface is less than the distance between the first end and the mounting surface.

9. The photoelectric conversion device of claim 8, wherein the bottom groove comprises a second optical surface perpendicularly connected with the first optical surface, the second optical surface comprises a plurality of second optical coupling lenses, each second optical coupling lens corresponding to each the first optical coupling lens.

10. The photoelectric conversion device of claim 9, wherein the top surface defines a top groove and the top groove is substantially cuboid, the top groove comprises a reflecting surface and a second bottom surface which is obliquely connected with the reflecting surface, the second bottom surface is parallel to the top surface, an angle formed between the reflecting surface and the second bottom surface is less than 90 degrees.

11. A photoelectric conversion device comprising:
a printed circuit board comprising a plurality of photoelectric conversion members mounted thereon; and
an optical coupling module comprising:
a top surface;
a first bottom surface parallel and opposite to the top surface, the first bottom surface defining a bottom groove comprising a first optical surface, the first optical surface being arranged with a plurality of first optical coupling lenses;
a front side surface perpendicularly connected with the top surface; and
a rear side surface parallel and opposite to the front side surface;
wherein the bottom groove further comprises a mounting surface, the mounting surface is parallel to the first optical surface and perpendicularly connected with the front side surface, wherein the distance between the mounting surface and the first bottom surface is less than the distance between the first optical surface and the first bottom surface, wherein the mounting surface defines a plurality of receiving grooves configured to receive optical fibers, wherein the receiving grooves comprise a central axis, the central axis extending transversely along a lengthwise direction of the receiving grooves to intersect with an optical axis of the first optical coupling lenses;
and a plurality of optical fibers, each optical fiber comprises an inclined end surface and a far end surface opposite to the inclined end surface, each optical fiber is inserted in the receiving grooves and the inclined end surface is arranged to be in contact with the light emitting member, and the optical fiber is configured to detect an alignment between the photoelectric conversion member and the first optical coupling lens.

12. The photoelectric conversion device of claim 11, wherein the photoelectric conversion member comprises a plurality of light emitting members for emitting optical signals and a plurality of light receiving members for converting electrical signals into optical signals.

13. The photoelectric conversion device of claim 12, wherein the light emitting member is a laser diode and the light receiving member is a photo diode.

14. The photoelectric conversion device of claim 13, wherein the mounting surface further comprises a cutout running through the front side surface and the mounting surface, the receiving groove being arranged in the cutout.

15. The photoelectric conversion device of claim 14, wherein the receiving groove is inclined relative to the mounting surface and comprises a first end and a second end spaced from and opposite to the first end, the distance between the second end and the mounting surface is less is closer than the distance between the first end and to the mounting surface.

16. The photoelectric conversion device of claim 15, wherein the bottom groove comprises a second optical surface perpendicularly connected with the first optical surface, the second optical surface comprises a plurality of second optical coupling lenses, each second optical coupling lens corresponding to each the first optical coupling lens.

17. The photoelectric conversion device of claim 16, wherein the top surface defines a top groove and the top groove is substantially cuboid, the top groove comprises a reflecting surface and a second bottom surface which is obliquely connected with the reflecting surface, the second bottom surface is parallel to the top surface, and an angle formed between the reflecting surface and the second bottom surface is less than 90 degrees.

18. The photoelectric conversion device of claim 17, wherein the mounting surface and the first optical surface cooperatively form a step portion.

* * * * *